(12) United States Patent
Abdo (10) Patent No.: US 12,263,550 B1
(45) Date of Patent: Apr. 1, 2025

(54) FLEXIBLE AND PRECISE FIXTURE FOR MICROMACHINING

(71) Applicant: KING SAUD UNIVERSITY, Riyadh (SA)

(72) Inventor: Basem Motea Abdullah Abdo, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/888,855

(22) Filed: Sep. 18, 2024

(51) Int. Cl.
| | |
|---|---|
| *B23Q 1/44* | (2006.01) |
| *B25B 1/02* | (2006.01) |
| *B25B 1/10* | (2006.01) |
| *B25B 1/24* | (2006.01) |
| *B25B 5/00* | (2006.01) |
| *B25B 5/10* | (2006.01) |

(52) U.S. Cl.
CPC ............... *B23Q 1/44* (2013.01); *B25B 1/02* (2013.01); *B25B 1/10* (2013.01); *B25B 5/109* (2013.01); *B25B 1/2494* (2013.01); *B25B 5/003* (2013.01)

(58) Field of Classification Search
CPC ........... B25B 1/10; B25B 1/02; B25B 1/2484; B25B 1/2494; B25B 5/003; B25B 5/006; B25B 5/10; B25B 5/109; B25B 5/14
See application file for complete search history.

(56) References Cited

U.S. PATENT DOCUMENTS

| | | | |
|---|---|---|---|
| 341,662 A * | 5/1886 | Kirkland | B25B 5/006 269/45 |
| 5,775,974 A | 7/1998 | Hulsebus | |
| 6,637,737 B1 | 10/2003 | Beecherl et al. | |
| 8,181,949 B2 | 5/2012 | Hung | |
| 8,806,995 B2 | 8/2014 | Kapoor et al. | |

FOREIGN PATENT DOCUMENTS

| | | |
|---|---|---|
| CN | 111531390 A | 8/2020 |
| CN | 211361938 U | 8/2020 |
| CN | 113997214 A | 2/2022 |
| KR | 20130008260 A * | 1/2013 |
| WO | 2005042207 A1 | 5/2005 |

OTHER PUBLICATIONS

"Multiple Part Workholding Fixtures"; PAWS Workholding; http://pawsworkholding.com; accessed Sep. 18, 2024.

* cited by examiner

*Primary Examiner* — Tyrone V Hall, Jr.
(74) *Attorney, Agent, or Firm* — Nath, Goldberg & Meyer; Joshua B. Goldberg (57) ABSTRACT

A flexible and precise fixture for micromachining includes a base and a support shaft extending vertically from the base. The support shaft includes a proximal end attached to the base and an enlarged distal end inserted inside a cavity of a clamp support block. One or more clamp jaws are provided on a top surface of the clamp support block. One or more angular pointers are included having a proximal end mounted pivotally on the base and a distal end pivotally mounted to the clamp support block, each pointer mounted to an individual side wall of the clamp support block. A washer and nut are mounted on the support shaft, the washer positioned between the nut and the clamp support block. The nut is threadedly mounted on the support shaft and may be tightened or loosened to place the clamp support block into a respective fixed or released position.

19 Claims, 9 Drawing Sheets

FLEXIBLE AND PRECISE FIXTURE FOR MICROMACHINING

BACKGROUND

Field

The disclosure of the present patent application relates to micromachining, and particularly to a micromachining fixture which is rotatable and tiltable for precise placement of a workpiece.

Description of Related Art

Micromachining is a manufacturing process used to create small-scale components with extremely precise dimensions. It involves the removal of material from a workpiece at a microscopic level using specialized tools and techniques. This process is commonly employed in various industries such as, for example, electronics, medical devices, aerospace, automotive, and telecommunications industries.

Micromachining can be carried out through several methods, including: micro-milling, micro-turning, micro-drilling, micro-EDM, micro-laser machining. Micro-milling is similar to conventional milling but on a much smaller scale, micro-milling uses rotating cutting tools to remove material from a workpiece. Micro-turning is a process that involves the rotation of the workpiece against a stationary cutting tool to remove material and create intricate geometries. Micro-drilling utilizes miniature drill bits and is used to create small holes in workpieces with high precision. Micro-EDM (Electrical Discharge Machining) is a process using electrical discharges to remove material from a workpiece, enabling precise machining of intricate shapes, even in hard materials. Micro-laser machining uses laser beams focused onto a workpiece to vaporize or melt material, allowing for precise cutting and engraving.

Micromachining is crucial in the electronics industry for producing components such as microchips, microelectromechanical systems (MEMS), sensors, and miniature electronic connectors. In the medical industry, micromachining is used to manufacture components for minimally invasive surgical tools, implants, microfluidic devices for lab-on-a-chip applications, and other medical devices requiring high precision. In the aerospace industry, micromachining is used to fabricate small but critical components including fuel injection nozzles, miniature actuators, and sensors for aircraft and spacecraft. In the automotive industry, micromachining produces precision components for fuel injectors, sensors, and other systems. In telecommunications, micromachining is used for small, precise components of fiber-optic connectors, waveguides, and other devices. Overall, micromachining plays a vital role in advancing technology by enabling the production of intricate components with high precision.

Despite the paramount importance of precision and accuracy in micromachining, typical clamping fixtures are only capable of being set in a static position and are unable to rotate or tilt. This inability to rotate or tilt is disadvantageous for several reasons. Without the ability to rotate or tilt the fixture, difficulty may arise in accessing areas of certain workpieces, particularly for machining operations requiring complex tool paths or multiple angles of approach. In addition, certain machining operations, such as contouring or milling complex geometries, may require the workpiece to be tilted or rotated to ensure optimal tool engagement and surface finish. Without this capability, the machining process may be less efficient and result in longer cycle times.

Another drawback of typical clamping fixtures is the inclusion of only a single clamp. With only a single clamp, challenges may arise in distributing clamping pressure evenly across a workpiece, especially for irregularly shaped or large parts. In addition, non-uniform clamping pressure can lead to part distortion, inaccuracies in machining, and potential damage to the workpiece. A single clamp may not adequately secure a workpiece, potentially leading to increased vibrations and a resulting poor surface finish and reduced accuracy.

A need therefore exists for a flexible and precise fixture for micromachining solving the aforementioned problems.

SUMMARY

A flexible and precise fixture for micromachining is provided, including a base and a support shaft extending vertically from the base. The support shaft includes a proximal end attached to the base and a distal end. A clamp support block is included having a cavity formed therein in which the distal end of the support shaft is inserted. The distal end of the support shaft may be enlarged and rounded in shape. One or more pairs of clamp jaws are included, the clamp jaws movable on a top surface of the clamp support block. An angular pointer has a proximal end mounted pivotally on the base and a pointer forming a distal end pivotally mounted to a side wall of the clamp support block. A washer and nut are mounted on the support shaft, the washer positioned between the nut and the clamp support block. The nut is threadedly mounted on the support shaft and may be tightened or loosened to place the clamp support block into a respective fixed or released position. The size of the cavity in the clamp support block may be sufficiently larger than the size of the distal end of the support rod, such that in a loosened position the clamp support block is tiltable and rotatable on the support shaft.

The fixture base may include one or more slots formed in an outer peripheral edge. The fixture base may include multiple slots spaced evenly apart around the outer peripheral edge. Two or more flexible and precise fixtures for micromachining may form a multi-part clamping system.

Two or more angular pointers having a proximal end pivotally mounted on the base and a pointer forming a distal end pivotally mounted to a side wall of the clamp support block may be provided. In a particular embodiment, four angular pointers are provided. In another embodiment, three pairs of clamp jaws movable on a top surface of the clamp support block are provided. The clamp jaws may include a male clamp member and a female clamp member.

Multiple pivot mount locations for attachment of the proximal end of the angular pointer may be provided, the pivot mount locations evenly spaced apart on the base to designate various angular positions to which the clamp support block may be rotated. The clamp support block may include angular markings on the side wall where the angular pointer is mounted to indicate a tilt angle of the clamp support block. Two or more angular pointers may be provided.

The fixture may include one or more pairs of clamp jaws including a fixed jaw and a movable jaw. The fixture may include one or more pairs of clamp jaws in which both clamp jaws are movable. The one or more pairs of clamp jaws may include a female jaw member and a male jaw member. The male jaw member may include a platform extension for placement of a workpiece, and the female member may include a corresponding slot for insertion of the platform extension.

The flexible and precise fixture for micromachining may include a first plate and a second plate. The first plate and second plate are fastened on an underside of the clamp support block between the washer and the clamp support block and include respective semi-circular cutouts which encircle the vertical support shaft. The first plate and second plate may be joined to the clamp support block by fasteners.

In an embodiment, a flexible and precise fixture for micromachining is provided including a base and a support shaft extending vertically from the base, the support shaft including a proximal end attached to the base and a distal end. A clamp support block is provided, the clamp support block is cubic in shape and includes a cavity formed therein in which the distal end of the support shaft is inserted. Three pairs of movable clamp jaws are provided on a top surface of the clamp support block. One or more angular pointers may be included having a proximal end mounted pivotally on the base and a pointer forming a distal end pivotally mounted to the clamp support block. Each pointer may be mounted to an individual side wall of the clamp support block. A washer and nut are mounted on the support shaft, the washer positioned between the nut and the clamp support block. The nut is threadedly mounted on the support shaft and may be tightened or loosened to place the clamp support block into a respective fixed or released position.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Referring to FIGS. 1A, 1B, 2A, and 2B, a flexible and precise fixture 1 for micromachining is provided, including a base 2 and a support shaft 4 extending vertically from the base 2, the support shaft 4 including a proximal end 4a attached to the base 2 such as by welding and a distal end 4b. Distal end 4b may be larger in diameter than support shaft 4, and hence referred to as "enlarged" distal end 4b. A clamp support block 6 is included having a cavity 8 formed therein (see FIG. 2B) in which the enlarged distal end 4b of the support shaft 4 is inserted. In a non-limiting example, the enlarged distal end 4b of the support shaft may be rounded and bulbous in shape as shown.

One or more pairs of clamp jaws 10 are included, the clamp jaws movable on a top surface of the clamp support block 6. In a non-limiting example, three pairs of clamp jaws 10 are included, wherein each of the jaws of the clamp jaw pairs are movable via threaded guidance screws 11. The forwards and backwards motion of the movable jaws may be accomplished by any suitable connection to guidance screws 11 known in the art of vice clamps such as, by way of non-limiting example, a slot and keyway, a non-threaded portion on guidance screws 11 inserted into the clamp jaws 10, a bearing connection, or any other suitable connection means. It is contemplated that any number of pairs of clamp jaws 10 may be provided on a top surface of the clamp support block 6. In a particular embodiment, the clamp jaws 10 may include a male clamp member 10a having a platform extension for placement of a workpiece, and a female clamp member 10b including a corresponding slot for insertion of the platform extension. In the non-limiting example shown, three pairs of clamp jaws are included in which both jaws are movable. It should be understood, however, that other arrangements are conceivable such as one or more pairs of a fixed jaw and a movable jaw, or a combination of fixed/movable, movable/movable pairs.

An angular pointer 12 is included having a proximal end 12a mounted pivotally on the base 2 and a distal end 12b mounted pivotally to a side wall of the clamp support block 2. The clamp support block 6 may include angular markings 6a on a given side wall where the angular pointer 12 is mounted to indicate a tilt angle of the clamp support block 6. Screws 13 may be used to fasten the angular pointer 12 in a desired position. Any number of angular pointers 12 may be provided as shown, each mounted to an individual side wall of the clamp support block 6.

A washer 14 and nut 16 are mounted on the support shaft 4, the washer 14 positioned between nut 16 and clamp support block 6. Nut 16 is threadedly mounted on support shaft 4 and is configured to be tightened or loosened to place the clamp support block 6 into a respective fixed or released position. The size of the cavity 8 in clamp support block 6 may be sufficiently larger than the size of the enlarged distal end 4b of the support rod, such that, in a loosened position, the clamp support block is rotatable 360° in a horizontal direction, and tiltable in the forwards, backwards, and side-to-side vertical directions.

Multiple locations for pivot mounts 20 may be provided on base 2 for attachment of the proximal end 12a of the angular pointer 12. The pivot mounts 20 may be evenly spaced apart on the base 2 to designate various angular positions to which the clamp support block 6 may be rotated. For example, eight pivot mounts 20 are shown, spaced evenly every 45° around base 20. Likewise, four pivot mounts 20 may be provided every 90° and so on.

Figure 1A:
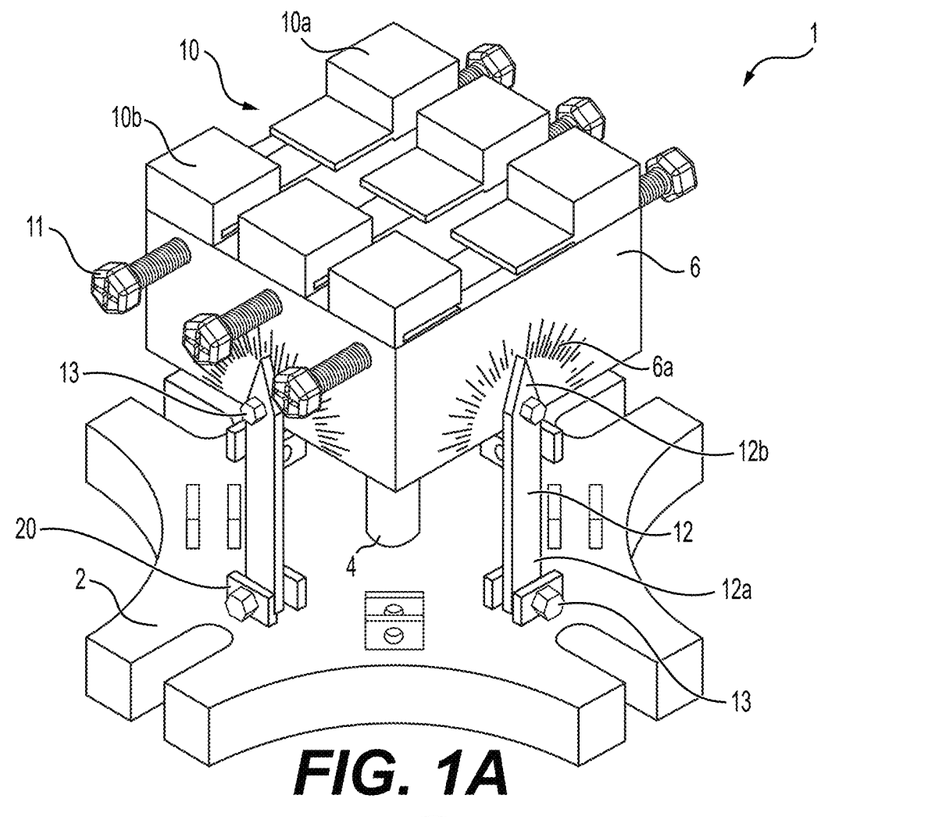
FIG. 1A is a perspective view of an assembled flexible and precise fixture for micromachining.
Figure 1B:
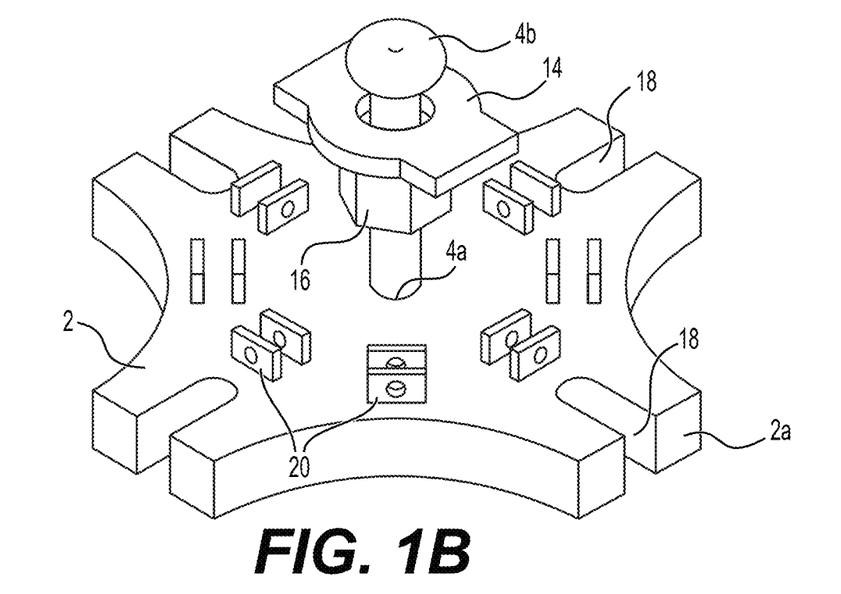
FIG. 1B is a perspective view of a partially assembled flexible and precise fixture for micromachining.
Figure 2A:
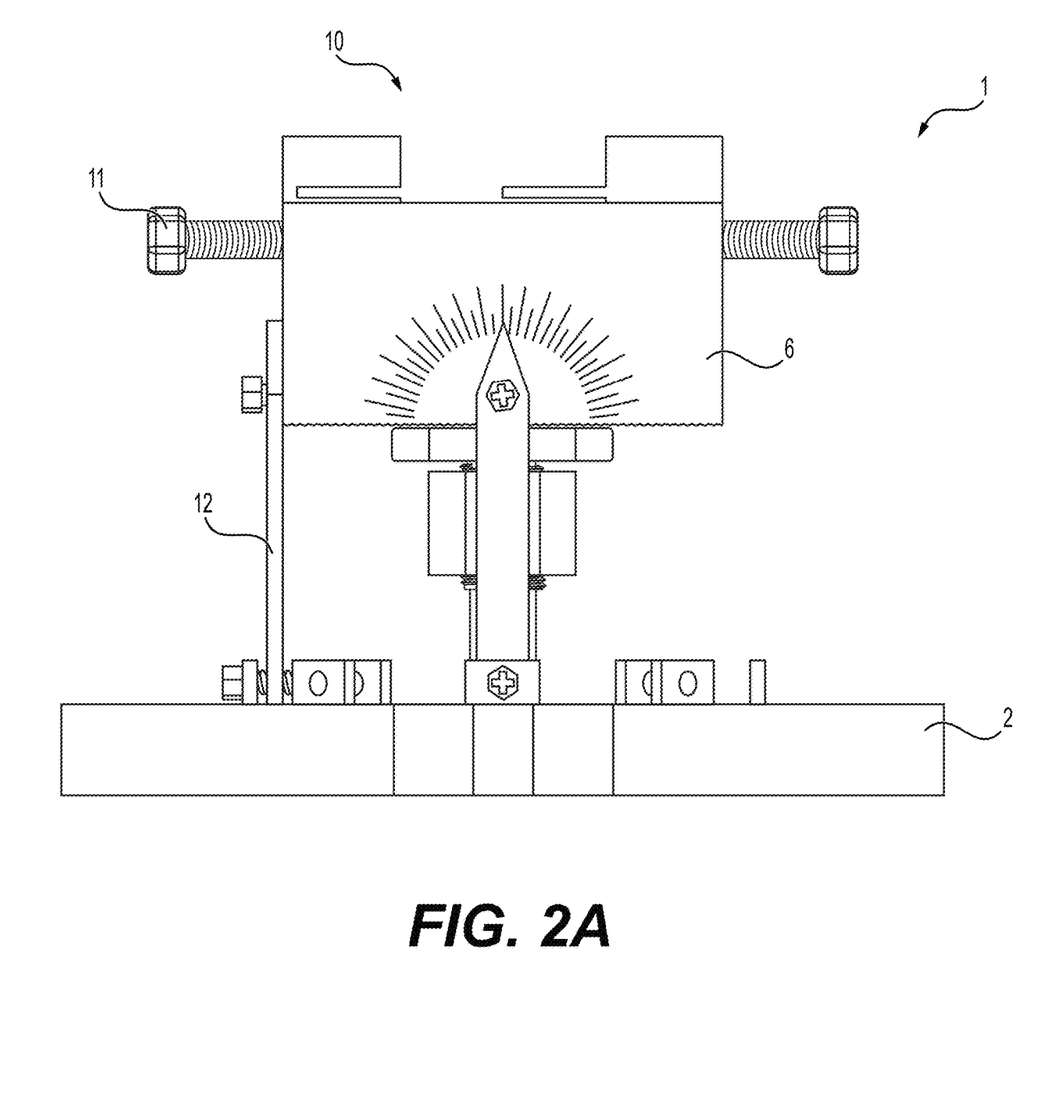
FIG. 2A is a side view of a flexible and precise fixture for micromachining.
Figure 2B:
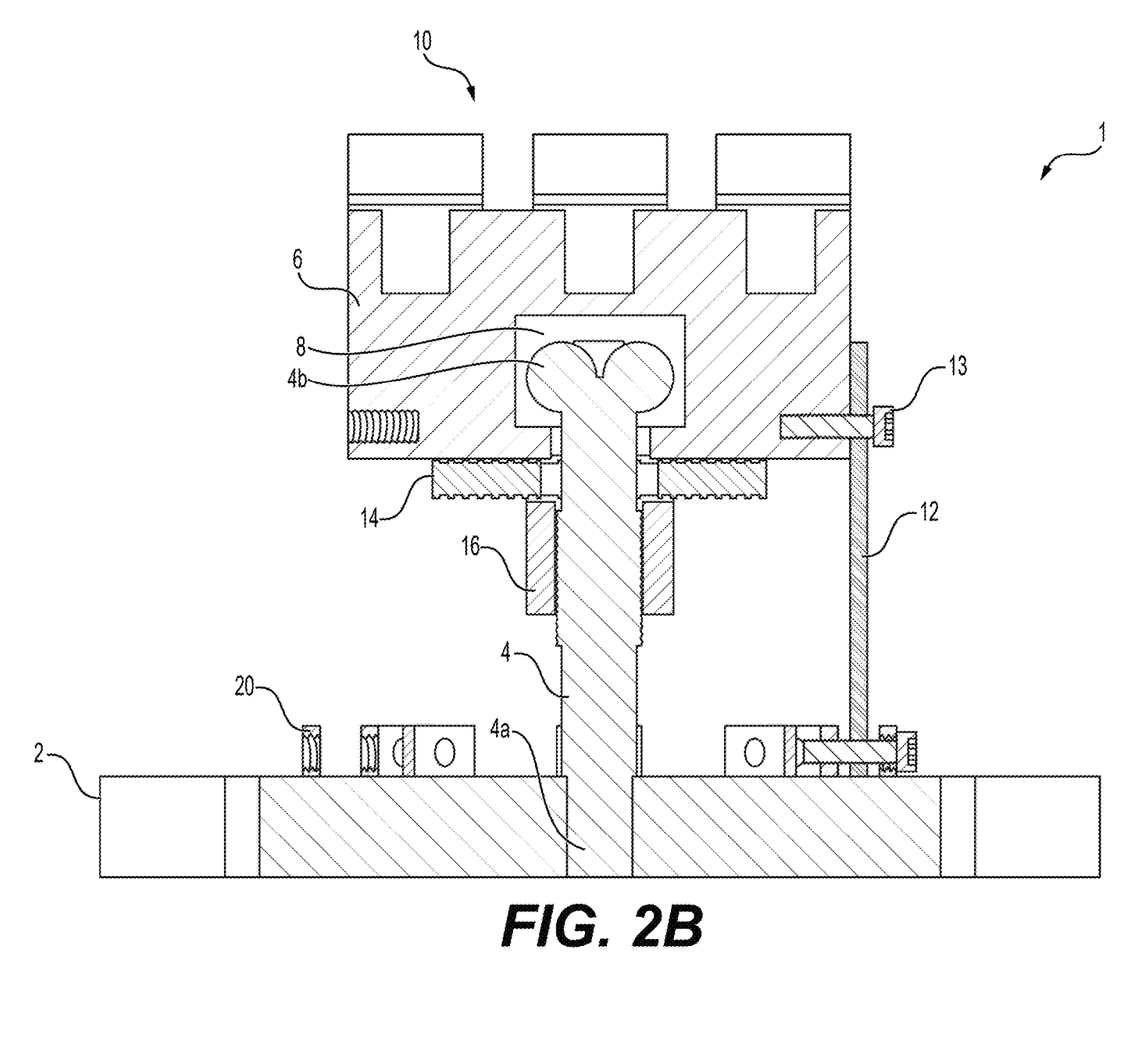
FIG. 2B is a side cross-section view of a flexible and precise fixture for micromachining.
Figure 2C:
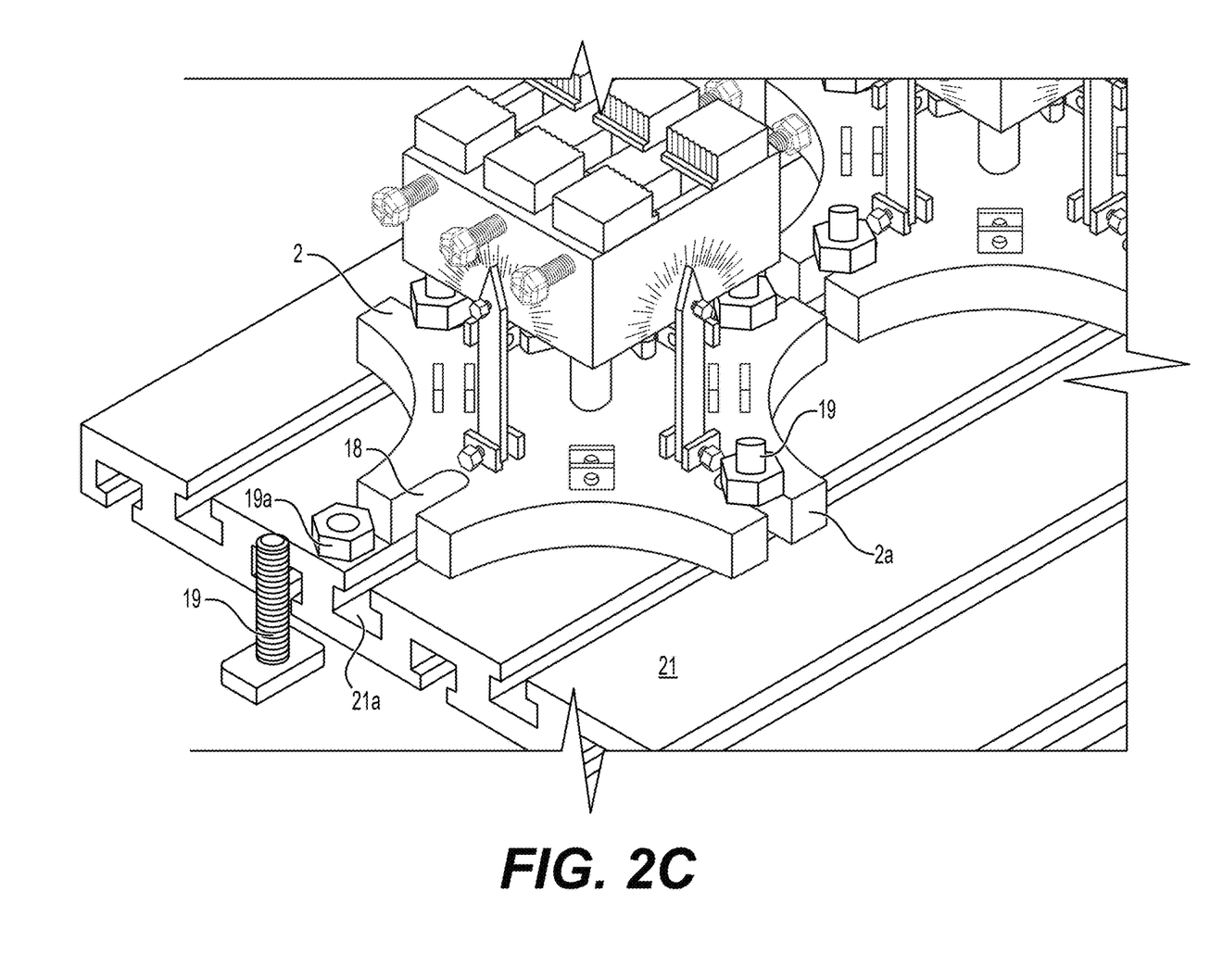
FIG. 2C is a perspective view of a flexible and precise fixture for micromachining and worktable.

Referring to FIG. 2C, the fixture base 2 may include one or more slots 18 formed therein for inserting a fastener 19 such as a bolt or T-bolt within slot 18 and a slot 21a formed in a worktable 21 of the type commonly used in micromachining operations, having multiple longitudinal slots 21a formed therein. The fastener 19 would be tightened within the slots 18, 21a and onto the worktable 21 by a nut 19a placed thereon. The base 2 may include multiple slots 18 as shown spaced evenly apart around an outer peripheral edge 2a.

Figure 3A:
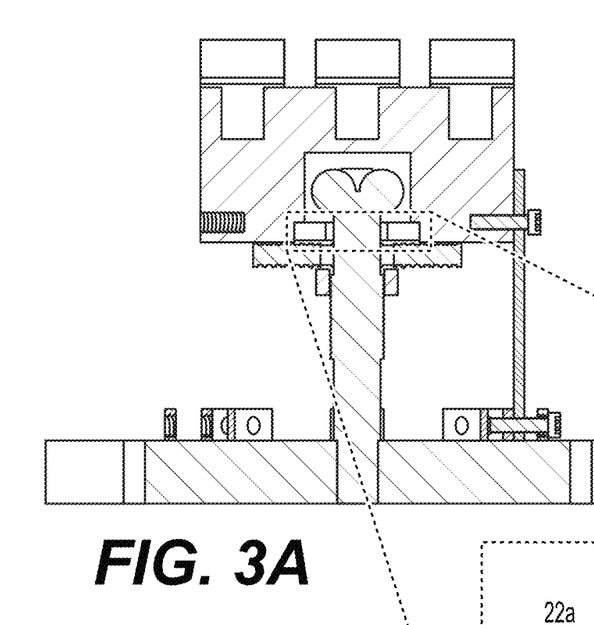
FIG. 3A is a side cross-section view of a flexible and precise fixture fitted with a first plate and second plate.
Figure 3B:
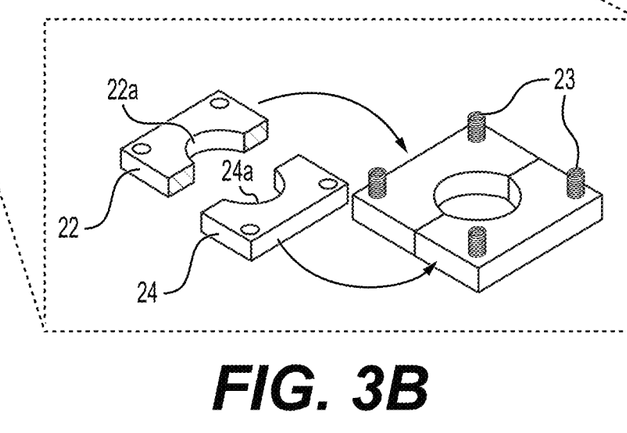
FIG. 3B is a view of a first plate and second plate used on a flexible and precise fixture for micromachining.

Referring to FIGS. 3A-C, the flexible and precise fixture 1 may include a first plate 22 and second plate 24. The first plate 22 and second plate 24 are placed on an underside of the clamp support block 6 between the washer 14 and the clamp support block 6, and include respective semi-circular cutouts 22a, 24a which encircle the vertical support shaft 4 when the first plate 22 and second plate 24 are mated. The first plate 22 and second plate 24 may be joined to the clamp support block 6 by fasteners 23.

Figure 4A:
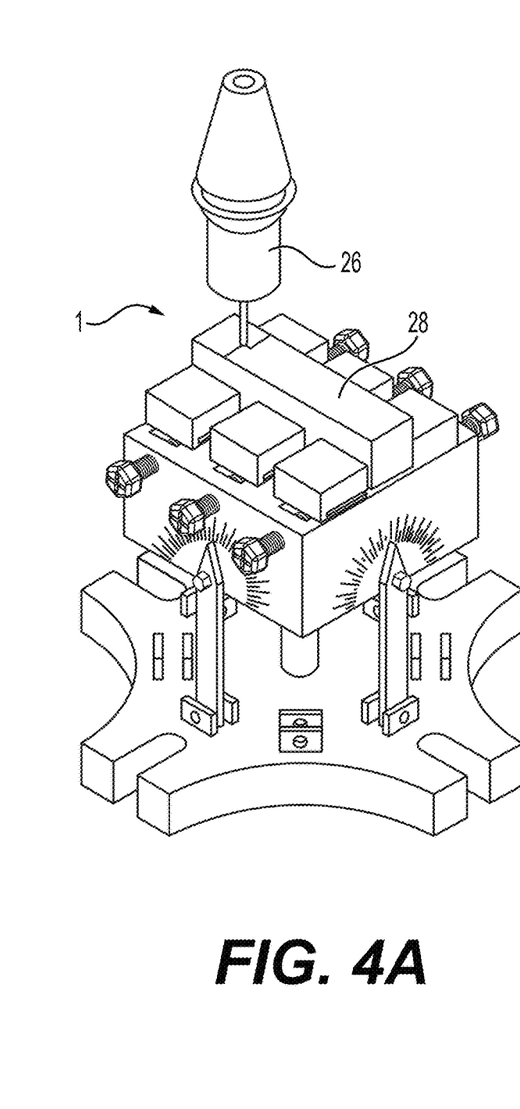
FIG. 4A is a perspective view of a straight workpiece used in a micromachining operation.
Figure 4B:
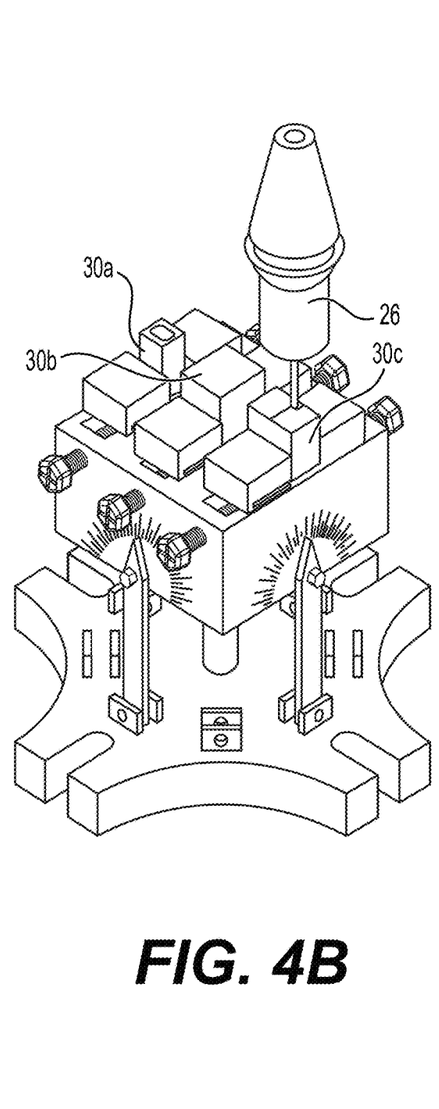
FIG. 4B is a perspective view of multiple different size workpieces used in a micromachining operation.
Figure 4C:
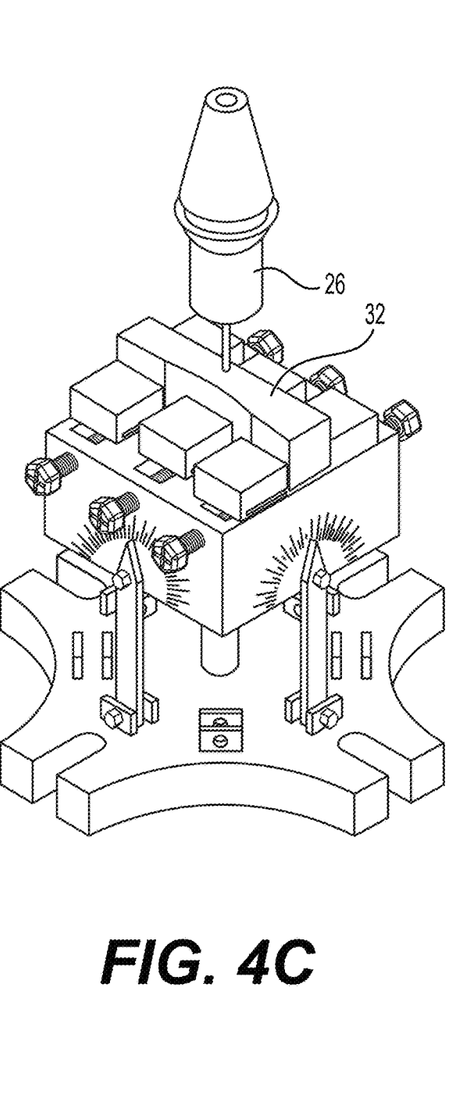
FIG. 4C is a perspective view of an irregular shaped workpiece used in a micromachining operation.

Referring to FIGS. 4A-C, the flexible and precise fixture 1 may be used for holding a variety of different workpieces to undergo micromachining by a milling tool 26. For example, a straight edge piece 28 may be held as shown in FIG. 4A, but also multiple pieces 30a, 30b, 30c of different sizes as shown in FIG. 4B, as well as an irregular shaped part 32 of varying cross-sectional area as shown in FIG. 4C.

Figure 5A:
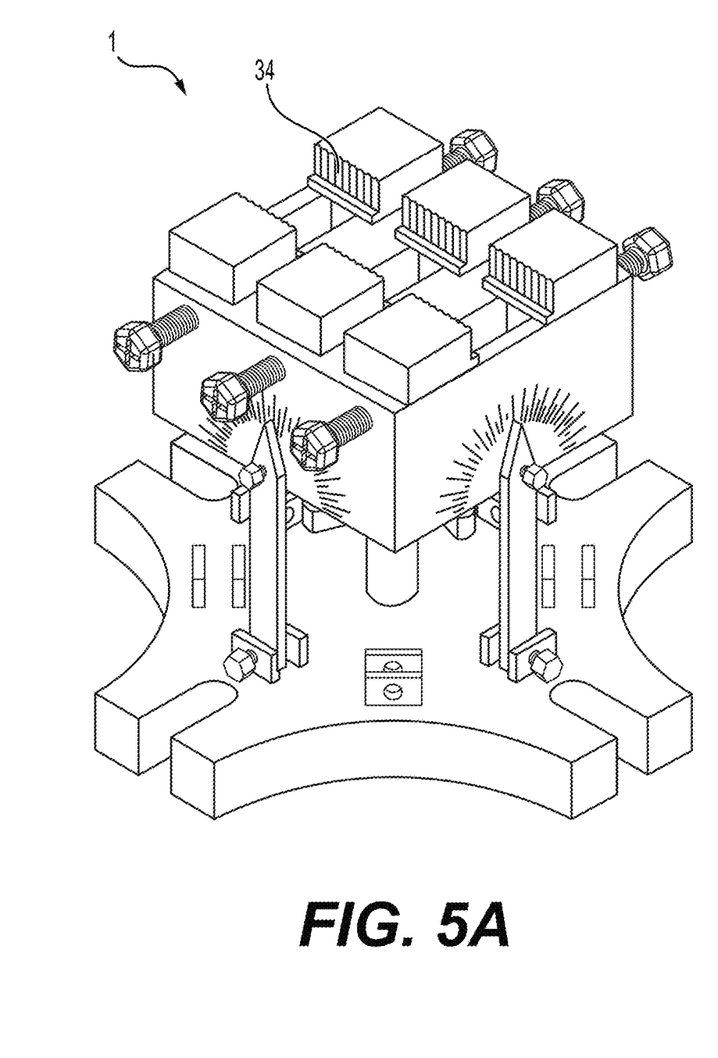
FIG. 5A is a perspective view of a flexible and precise fixture for micromachining having a flat clamping surface.
Figure 5B:
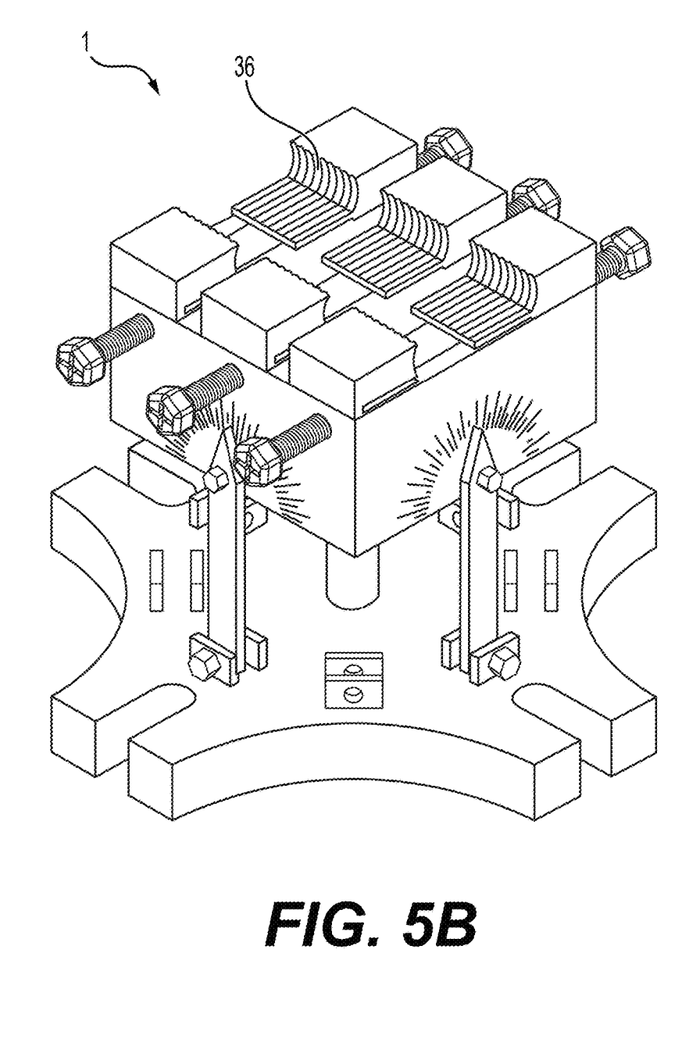
FIG. 5B is a perspective view of a flexible and precise fixture for micromachining having a curved clamping surface.
Figure 5C:
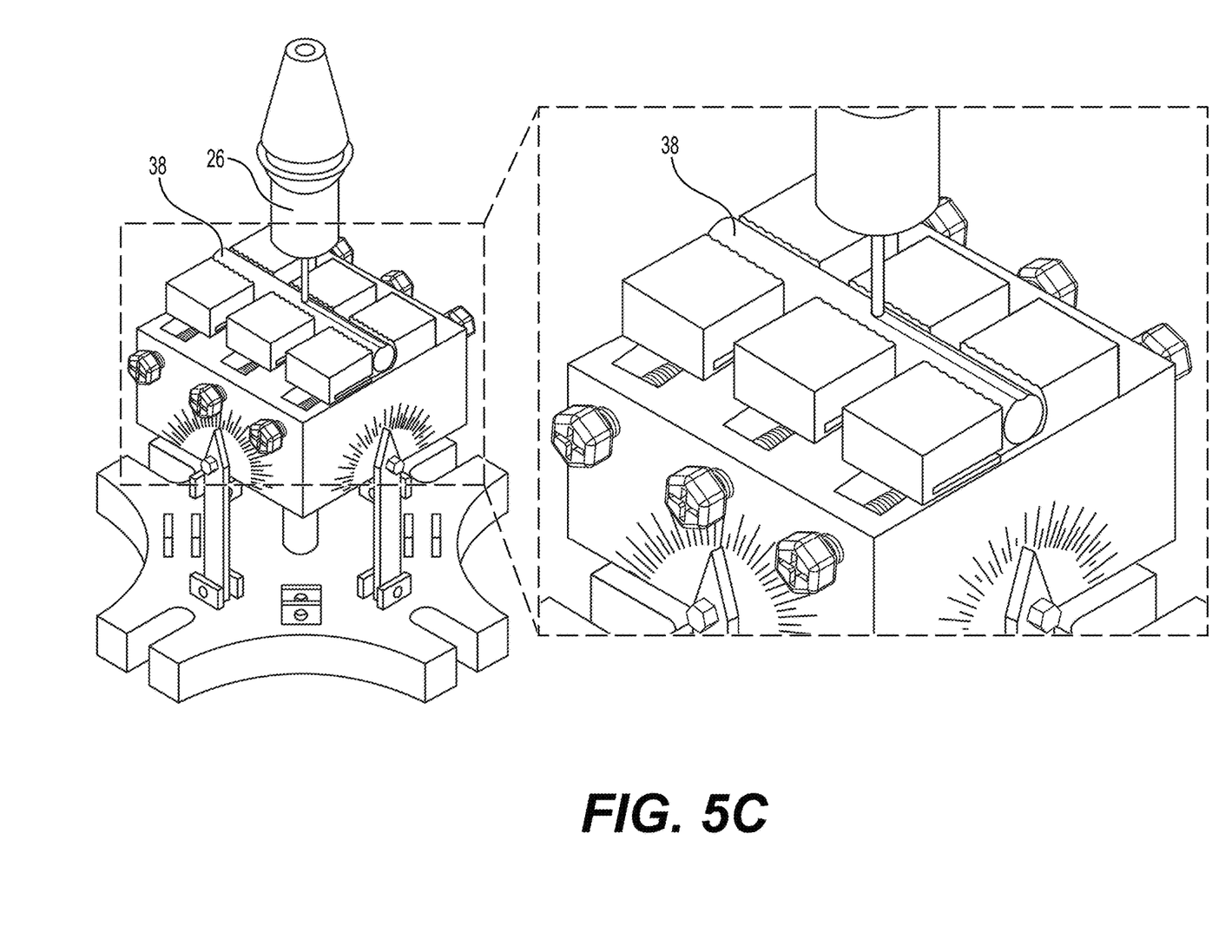
FIG. 5C is a perspective view of a micromachining operation on a workpiece of circular cross section.

With reference to FIG. 5A-C, different clamping surfaces may be used for holding the workpiece. A flat surface 34 may be provided as shown in FIG. 5A, as well as a curved surface 36 as shown in FIG. 5B, 5C for gripping a workpiece 38 of circular cross section. Different jaws may have the same type of clamping surface or different jaws may be fitted with a combination of flat and curved surfaces depending on the desired application or workpiece.

Figure 6:
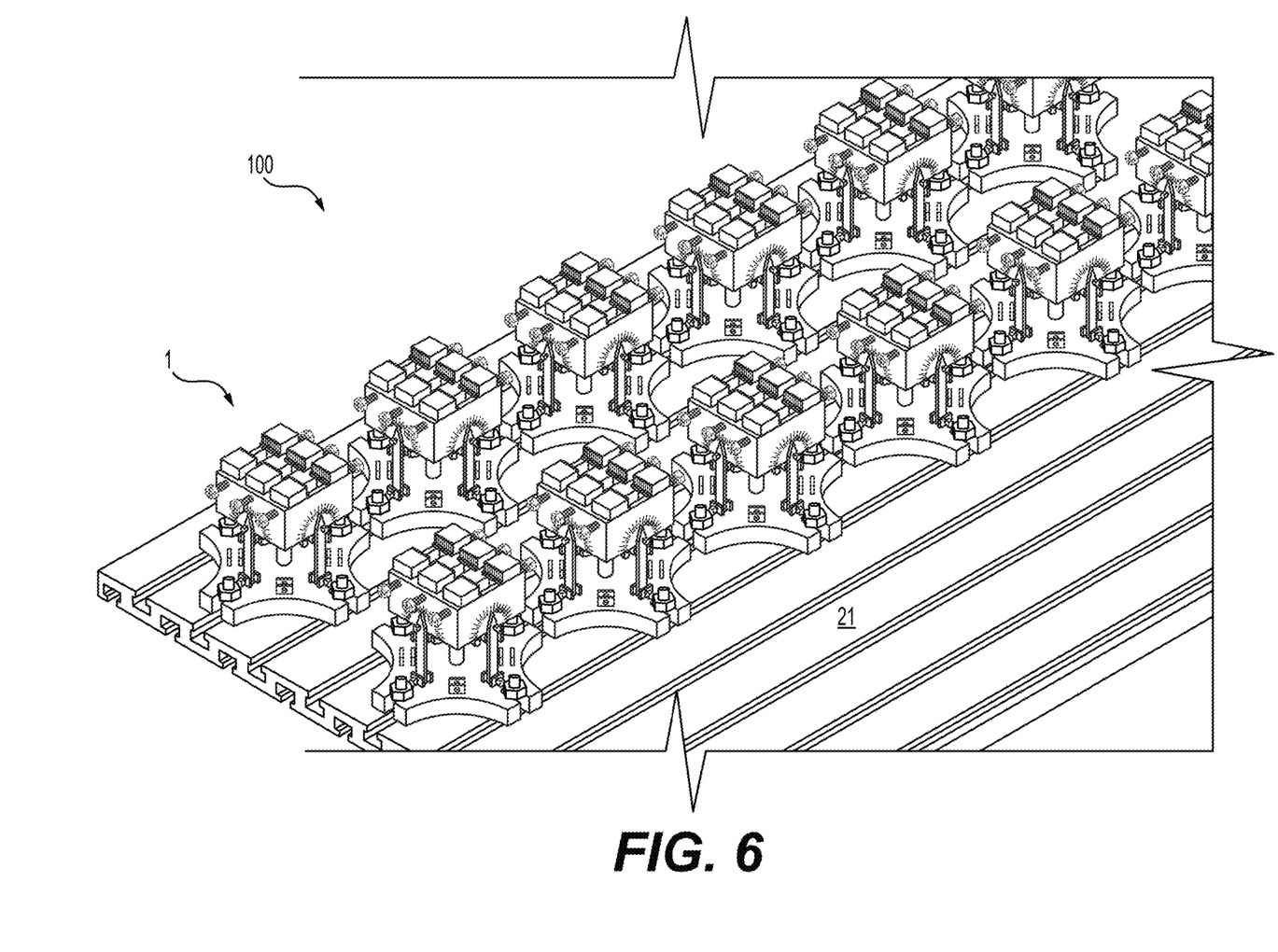
FIG. 6 is a perspective view of a multi-part clamping system.

Referring to FIG. 6, two or more flexible and precise fixtures 1 for micromachining may form a multi-part clamping system 100. Such a multi-part clamping system 100 would be beneficial in a mass-production system where a high volume of micromachining milling operations are performed.

It is to be understood that the flexible and precise fixture for micromachining is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A fixture for micromachining comprising:
a base;
a support shaft extending vertically from the base, wherein the support shaft includes a proximal end attached to the base and a distal end;
a clamp support block, wherein the clamp support block includes a cavity formed therein in which the distal end of the support shaft is inserted;
one or more pairs of clamp jaws movable on a top surface of the clamp support block;
an angular pointer having a proximal end mounted pivotally on the base and a pointer forming a distal end pivotally mounted to a side wall of the clamp support block; and
a washer and nut mounted on the support shaft, wherein the washer is positioned between the nut and the clamp support block, and the nut is threadedly mounted on the support shaft and is configured to be tightened or loosened to place the clamp support block into a respective fixed or released position.

2. The fixture for micromachining as recited in claim 1, wherein the size of the cavity in the clamp support block is larger than the size of the distal end of the support rod, such that, in a loosened position, the clamp support block is tiltable and rotatable on the support shaft.

3. The fixture for micromachining as recited in claim 1, wherein the base includes one or more slots formed therein.

4. The fixture for micromachining as recited in claim 3, wherein the base includes multiple slots spaced evenly apart around an outer peripheral edge thereof.

5. The fixture for micromachining as recited in claim 1, further comprising four angular pointers having a proximal end pivotally mounted on the base and a pointer forming a distal end pivotally mounted to a side wall of the clamp support block.

6. The fixture for micromachining as recited in claim 1, further comprising three pairs of clamp jaws movable on a top surface of the clamp support block.

7. The fixture for micromachining as recited in claim 1, wherein each of the one or more clamp jaws include a male clamp member and a female clamp member.

8. The fixture for micromachining as recited in claim 1, further comprising multiple pivot mount locations for attachment of the proximal end of the angular pointer, the pivot mount locations evenly spaced apart on the base to designate various angular positions.

9. The fixture for micromachining as recited in claim 1, wherein the clamp support block includes angular markings on the side wall where the angular pointer is mounted.

10. The fixture for micromachining as recited in claim 9, comprising two or more angular pointers, each having a proximal end mounted pivotally on the base and a pointer forming a distal end pivotally mounted to a side wall of the clamp support block, wherein the side walls of the clamp support block in which the angular pointers are mounted include angular markings.

11. The fixture for micromachining as recited in claim 1, wherein the one or more pairs of clamp jaws include a fixed jaw and a movable jaw.

12. The fixture for micromachining as recited in claim 1, wherein both jaws of the one or more pairs of clamp jaws are movable jaws.

13. The fixture for micromachining as recited in claim 1, wherein the one or more pairs of clamp jaws include a female jaw member and a male jaw member, the male jaw member includes a platform extension for placement of a workpiece, and the female member including a corresponding slot for insertion of the platform extension.

14. The fixture for micromachining as recited in claim 1, wherein the distal end of the support shaft is larger in diameter than the support shaft and rounded in shape.

15. The fixture for micromachining as recited in claim 1, further comprising a first plate and second plate, wherein the first plate and second plate are fastened on an underside of the clamp support block between the washer and the clamp support block, the first plate and second plate including respective semi-circular cutouts which encircle the vertical support shaft when mated together.

16. The fixture for micromachining as recited in claim 15, wherein the first plate and second plate are joined to the clamp support block by fasteners.

17. A multi-part clamping system using two or more of the fixtures for micromachining of claim 1.

18. A fixture for micromachining comprising:
a base;
a support shaft extending vertically from the base, wherein the support shaft includes a proximal end attached to the base and a distal end;

a clamp support block, wherein the clamp support block is a cuboid shape and includes a cavity formed therein in which the distal end of the support shaft is inserted;

three pairs of movable clamp jaws on a top surface of the clamp support block;

a washer and nut mounted on the support shaft, wherein the washer is positioned between the nut and the clamp support block, and the nut is threadedly mounted on the support shaft and is configured to be tightened or loosened to place the clamp support block into a respective fixed or released position; and one or more angular pointers having a proximal end mounted pivotally on the base and a pointer forming a distal end pivotally mounted to the clamp support block.

19. The fixture for micromachining as recited in claim 18, comprising two or more angular pointers, wherein each pointer is mounted to an individual side wall of the clamp support block.

* * * * *